(12) United States Patent
Talkin

(10) Patent No.: US 8,444,346 B2
(45) Date of Patent: May 21, 2013

(54) METHOD OF INSTALLING GEOTHERMAL HEAT PUMP SYSTEM AND DEVICE FOR INSTALLATION

(75) Inventor: Luke Talkin, Sumerduck, VA (US)

(73) Assignee: United Air Temp Heating & Air-Conditioning, Inc., Springfield, VA (US)

( * ) Notice: Subject to any disclaimer, the term of this patent is extended or adjusted under 35 U.S.C. 154(b) by 346 days.

(21) Appl. No.: 12/704,727

(22) Filed: Feb. 12, 2010

(65) Prior Publication Data

US 2011/0200394 A1 Aug. 18, 2011

(51) Int. Cl.
*E21B 33/13* (2006.01)

(52) U.S. Cl.
USPC ............................. 405/184; 166/57; 165/173

(58) Field of Classification Search
USPC ........... 405/155, 174, 178, 184, 184.4, 484.5; 166/57; 175/56; 165/171, 173
See application file for complete search history.

(56) References Cited

U.S. PATENT DOCUMENTS

| | | | |
|---|---|---|---|
| 5,452,853 A * | 9/1995 | Shook et al. ...................... 239/7 |
| 5,590,715 A * | 1/1997 | Amerman ...................... 166/290 |
| 7,017,650 B2 | 3/2006 | Johnson, Jr. et al. |
| 7,213,649 B2 * | 5/2007 | McNair et al. ................. 166/302 |
| 7,270,182 B2 | 9/2007 | Johnson, Jr. |
| 7,431,105 B2 | 10/2008 | Stevens |
| 2007/0114019 A1 * | 5/2007 | Brezinski et al. .............. 166/207 |

OTHER PUBLICATIONS

Horizontal Directional Drills and Directional Drilling Units, http://www.vermeer.com/v/com/TrenchlessEquipment/Model, downloaded Feb. 3, 2010.
Geothermal Heat Pumps, (Geoexchange or Ground-coupled Heat Pumps), New York State, http://www.nyserda.org/programs/geothermal/default.asp, downloaded Jun. 29, 2009.
Geothermal or Ground Source Heat Pumps, California Energy Commission, Consumer Energy Center, http://www.consumerenergycenter.org/home/heating_cooling/geothermal.html, downloaded Jun. 29, 2009.
Doug Rye et al., Lower Your Utility Bills, Geothermal Heat Pump Systems, http://www.geothermal-heat-pump-resource.org, downloaded May 13, 2009.

* cited by examiner

*Primary Examiner* — Tara M. Pinnock
*Assistant Examiner* — Benjamin Fiorello
(74) *Attorney, Agent, or Firm* — Bacon & Thomas, PLLC

(57) ABSTRACT

An installation tool for installation of earth loops includes a cylindrical body with slots in its outer surface, for receiving of tubes of the earth loops, and a central passage extending therethrough from a grout fitting to a central opening at a leading end face of the cylindrical body. An anchor fits over the end face and includes a face plate with tube apertures extending therethrough, a retainer ring which serves to hold the earth loops in place within the slots during insertion of the tool into the borehole, and a pair of flexible plates extending from opposing positions on the retainer ring, approximately in parallel with the longitudinal axis of the cylindrical body. In use, a plurality of straight (linear) boreholes are drilled at an angle relative to the horizontal of 5° to less than 90°, preferably 5° to 45°, at least two coupled tube pairs are inserted into each borehole and then grout is injected to force the anchor away from the cylindrical body, to fill the boreholes surrounding the earth loops and to form a seal for heat exchange between the earth loops the surrounding earth.

9 Claims, 6 Drawing Sheets

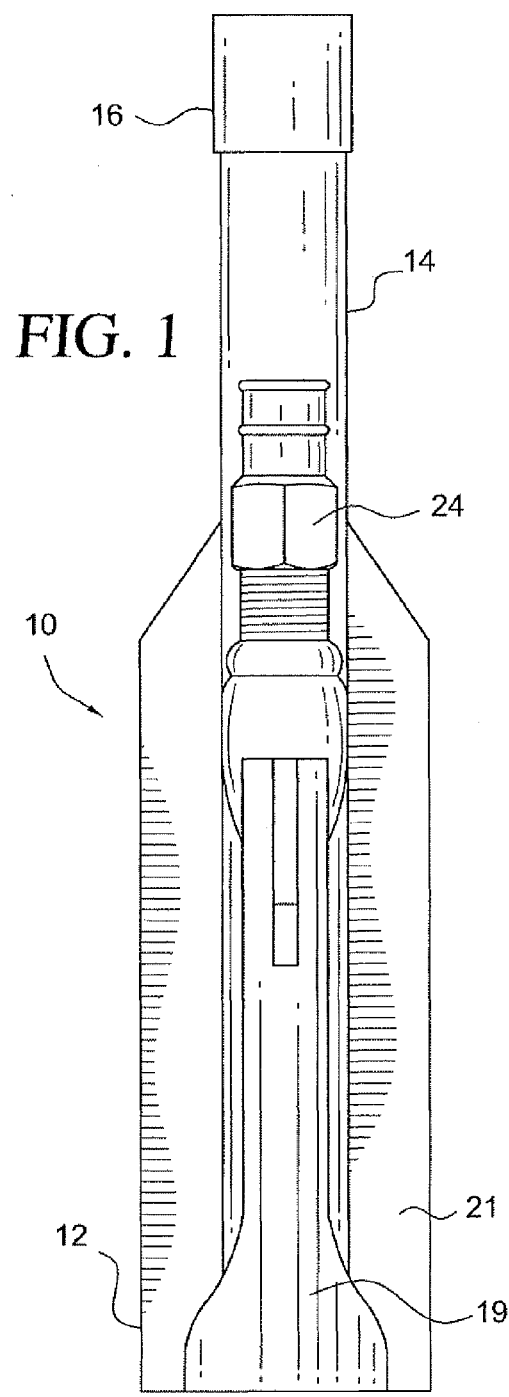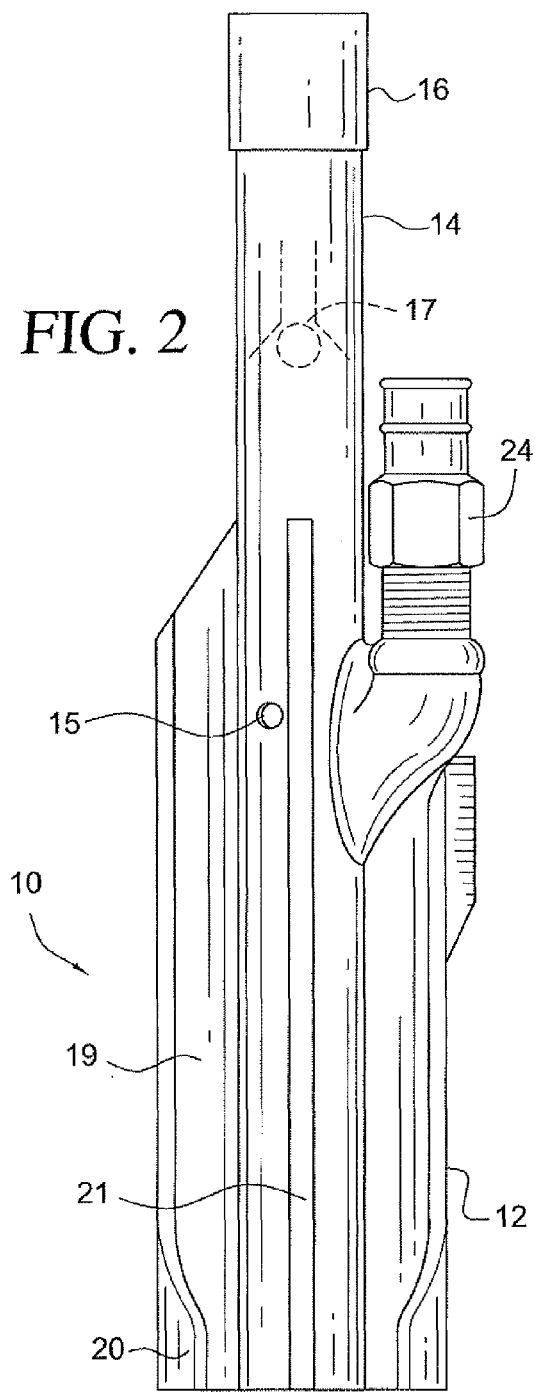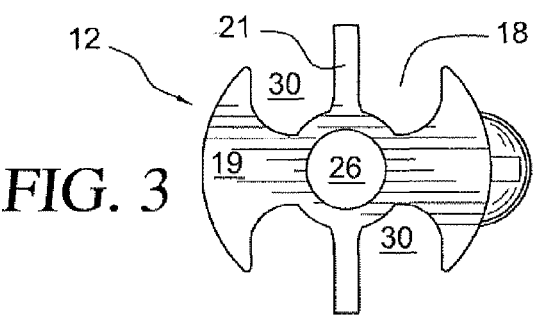

METHOD OF INSTALLING GEOTHERMAL HEAT PUMP SYSTEM AND DEVICE FOR INSTALLATION

BACKGROUND OF THE INVENTION

1. Field of the Invention

The present invention relates to installation of heat exchange loops ("earth loops") for a geothermal heat pump system and to a tool for use in the installation and to a compact geothermal heat pump system.

2. The Prior Art

In recent years, heat pumps have become widely used for both heating and cooling of residential and other buildings. Because of the numerous cost and environmental advantages they provide, heat pump systems have come to replace the traditional heating/cooling systems which employ the combination of a furnace, typically gas-fired or electric, and an air-conditioning system. More specifically, as compared to gas-fired (combustion) furnaces, in a heating mode, heat pump systems provide a more uniform temperature throughout a building, without a sudden blast of hot air on start-up and do not dry out the air as do the traditional furnaces, thus maintaining a higher humidity and a healthier indoor environment. Further, because of their year round use, heat pump systems cost less per hour of use than does the combination of individual heating and cooling systems.

In geothermal heat pump systems, "earth loops" (buried in the earth) of tubing or piping substitute for the standard heat exchange coil which is used for heat exchange between the refrigerant within the coil and the exterior, ambient air and which is typically mounted outside the building. In the buried earth loop, heat exchange occurs between the refrigerant and the earth, rather than between the refrigerant and the ambient air as in a conventional heat pump system.

A significant expense unique to the geothermal heat pump systems is the cost of installation of the earth loops. Typically, a depth of approximately 3-5 feet under the surface of the earth is required for effective heat exchange between the earth loop and the earth. The earth above the 3-foot depth is more susceptible to temperature changes due to sunshine and changes in weather in general. Further, the present inventor has found that earth within 10 feet of an earth loop tube is affected by heat exchange with the earth loop, i.e. a volume of earth approximately 20 feet in diameter. Accordingly, for maximum heat exchange efficiency, earth loops should be installed with a minimum separation and at least five feet, and preferably 10 or more feet, deep in the earth.

One conventional approach to installation of earth loops involves the digging of horizontal trenches, laying the earth loops within the trenches and covering. However, this system requires removal of a considerable amount of earth and/or rock and results in disturbance of the land surface and possible damage to the landscape.

Another approach to installation of the earth loops is use of conventional well drilling equipment and a vertical orientation of the earth loops. However, this approach, in many areas of the country, is more likely to encounter bedrock and a high drilling cost. Even absent the problem of bedrock, i.e. in the coastal plain and river deltas, the earth becomes more compact with depth, resulting in higher drilling cost with increase in depth. U.S. Pat. Nos. 7,017,650, 7,270,182 and 7,431,105 are exemplary of disclosures of vertical earth loop installation.

More recently, cable pulling machinery has been adapted to earth loop installation. This technique requires both a point of entry and an exit, spaced a sufficient distance apart to provide a run of tubing or piping of a length providing sufficient heat exchange. However, the dimensions of residential property often do not provide a length of property sufficient for proper spacing between the points of entry and exit. Further, this pull-through installation necessarily uses a curved borehole which complicates filling with grout around the tubing to provide a good seal for heat exchange between the tubing and the earth.

SUMMARY OF THE INVENTION

The present invention provides a tool for installation of at least one coupled tube pair in a borehole, to a blind end of the borehole. The installation tool has a cylindrical body, or head portion, presenting a cylindrical outer surface and a central passage extending along a central, longitudinal axis of the cylindrical body, from a grout fitting for connecting a grout hose to a central opening at a leading end face of the cylindrical body. At least two slots ("cylindrical recesses" or "scallops") extend along the length of the cylindrical body and open at the outer, cylindrical surface of the cylindrical body for respectively receiving leading end portions of the tubes of the coupled pair.

The installation tool of the invention additionally includes an anchor (or "shield/anchor") which fits over the cylindrical body. The anchor includes a face plate with tube apertures extending therethrough. The anchor further includes a retainer ring which is integral with the face plate which removably fits over one end of the cylindrical body, to hold the coupled tube pair in place within the slots during insertion of the tool into the borehole, and a pair of flexible plates integral with the retainer ring and extending from opposing positions on the retainer ring, approximately in parallel with the longitudinal axis of the cylindrical body.

In another aspect, the present invention provides a method for installation of a geothermal heat exchange loop which includes: drilling a plurality of straight (linear) boreholes, each with a blind end in the earth, at an angle of 5° to less than 90°, or in view of the limitations of the apparatus disclosed herein, 5°-45° relative to the horizontal; inserting at least one coupled tube pair into each borehole, coupled ends first, for service as the geothermal heat exchange loop(s).

During removal of the insertion tool from the borehole a thermally conductive grouting material is injected, via a grout pipe attached to a central passage within the tool, to form a seal (and thermal connection) between the paired tubes and the surrounding earth. The earth loops in the boreholes are then connected in series (or parallel depending on system design specifications) and the serially/parallel connected earth loops are then connected.

In yet another aspect, the present invention provides a method for installation of a geothermal heat exchange loop using the tool with anchor as described above. This method includes: forming a straight (linear) borehole in the earth at an angle slanted relative to the horizontal but less than 90° relative to the horizontal and extending to a blind end; inserting free ends of a pair of tubes through the tube apertures of the face plate; mounting at least one pair of tubes, for service as a geothermal heat exchange loop ("earth loop"), in the slots of the cylindrical body of the tool; coupling together leading ends of the at least one pair of tubes; fitting the retainer ring over the forward end of the cylindrical body of the tool to hold the coupled tube pair within the slots during insertion into the borehole; inserting the thus assembled cylindrical body, coupled tube pair and anchor into the borehole, to the blind end of the borehole; injecting grout through the grout fitting and out the central opening to force the face plate of the anchor away from the cylindrical body of the tool, to spread apart the flexible plates and to force the coupled tube pair out of the slots; withdrawing the cylindrical body from the borehole whereby distal ends of the flexible plates engage the earth, i.e. the sidewall of the borehole, to hold the anchor within the borehole, adjacent the blind end; and filling the borehole with the grout as the cylindrical body is withdrawn from the borehole, leaving the anchor behind at the blind end of the borehole.

As compared to the conventional well (vertical) drilling method, the method of the present invention offers the advantage of reducing or eliminating drilling through the bedrock. Also, the problem of soil becoming more compact at depth, slowing drilling speed, is mitigated.

As compared with horizontal installation of earth loops, the method of the present invention requires far less excavation and surface disturbance and, therefore, incurs less cost.

Unlike the pull-through method, the method of the present invention requires no exit point and, therefore, requires less in property dimensions and provides a more efficient use of tubing in that a higher percentage of the earth loop is emplaced deeper than 3 feet and deeper than 8 feet. Further, a linear borehole on a slant has been found to enable a better, more complete grout fill between the tubing and the surrounding earth, i.e. a better seal and better heat exchange.

BRIEF DESCRIPTION OF THE DRAWINGS

FIG. 1 is a side view of the installation tool;

FIG. 2 is another side view of the installation tool, turned 90° around its longitudinal axis from the position shown in FIG. 1;

FIG. 3 is a front end view of the installation tool;

DESCRIPTION OF THE PREFERRED EMBODIMENTS

Figure 4:
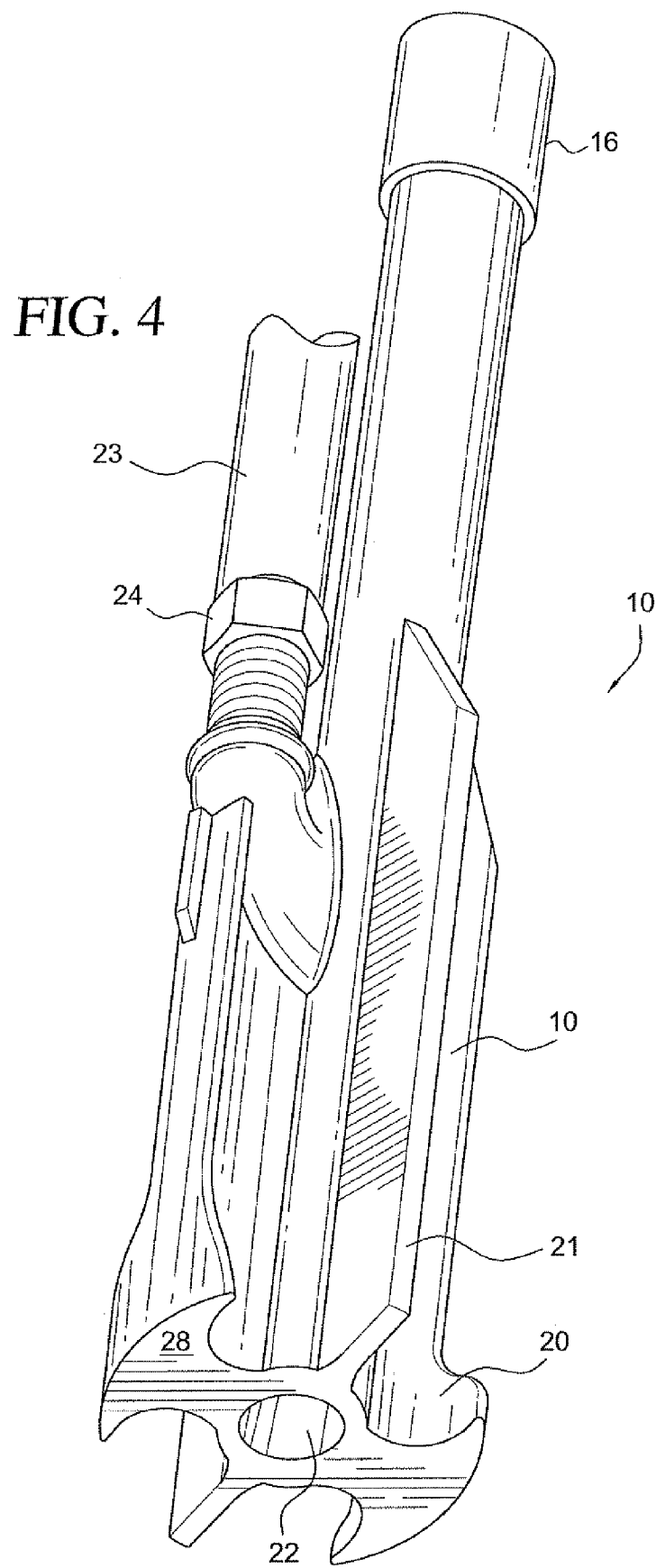
FIG. 4 is a perspective view of the installation tool.
Figure 5:
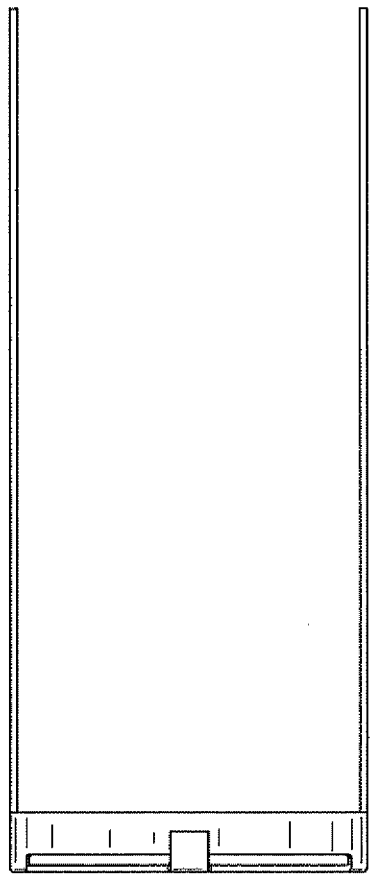
FIG. 5 is a side view of the anchor.
Figure 6:
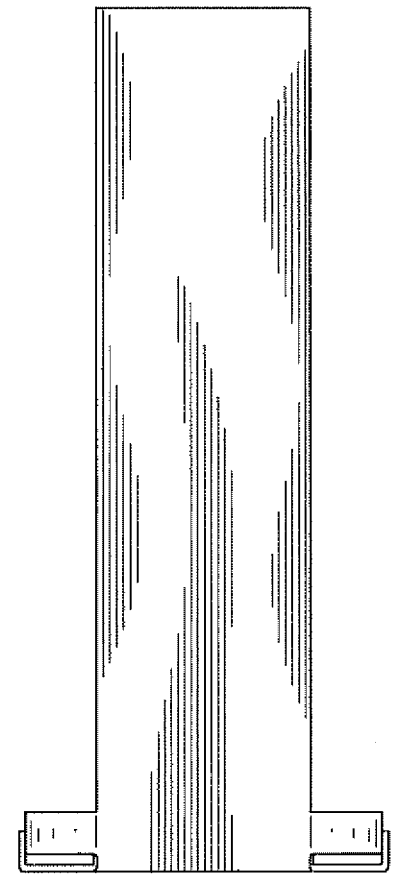
FIG. 6 is another side view of the anchor turned 90° around its longitudinal axis from the position shown in FIG. 5.
Figure 7:
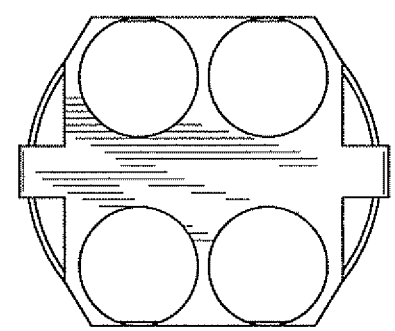
FIG. 7 is a front end view of the anchor.
Figure 8:
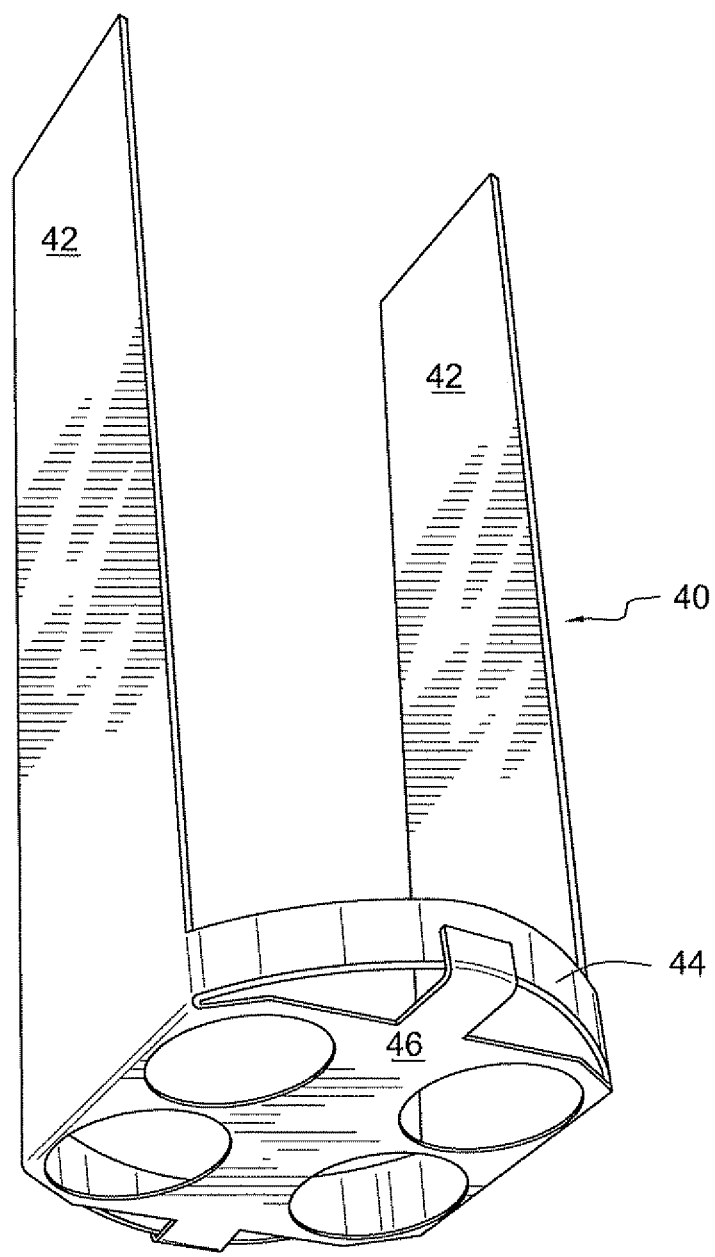
FIG. 8 is a perspective view of the anchor of FIGS. 5-7.
Figure 9:
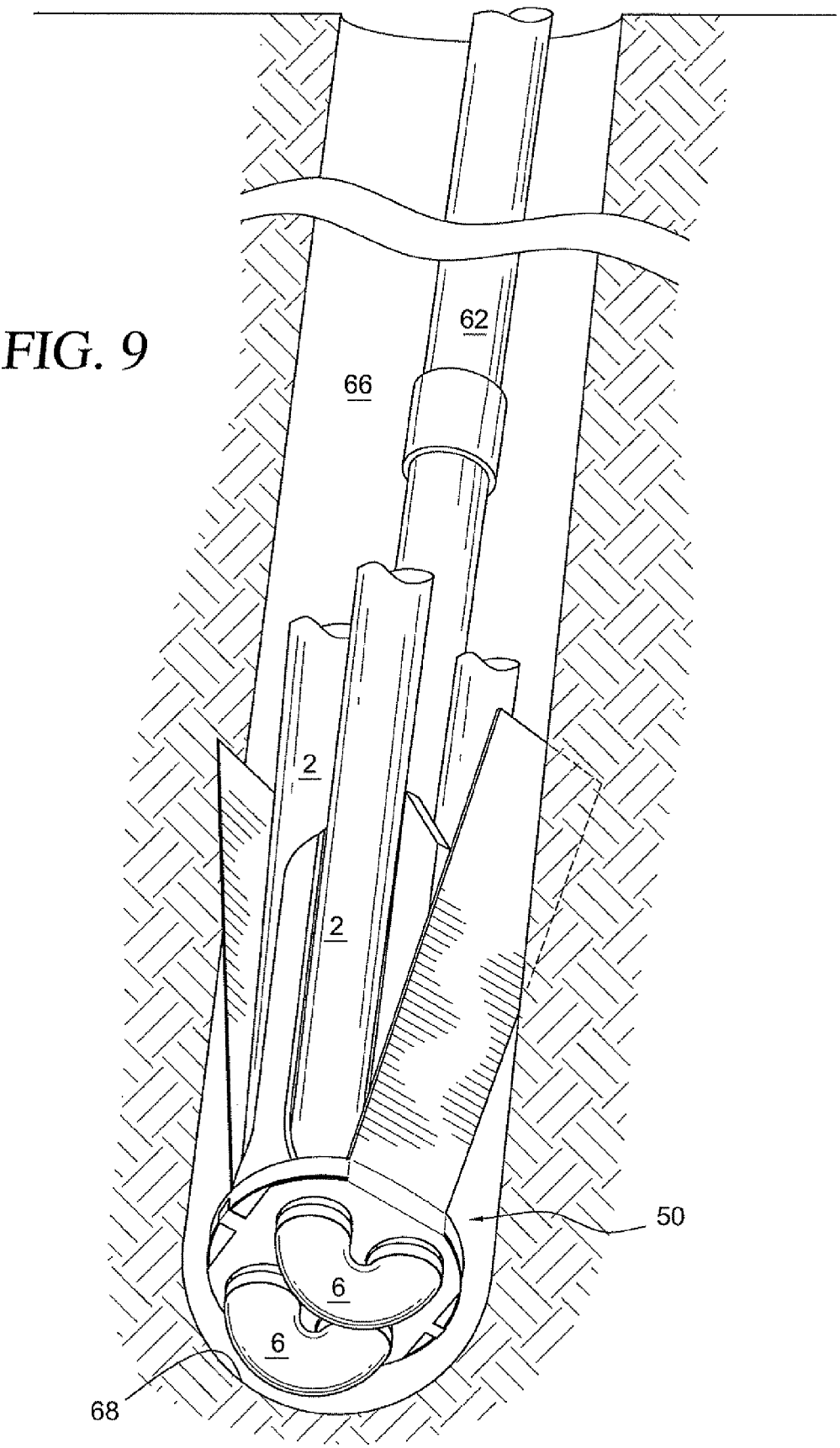
FIG. 9 is a perspective view of the installation tool, with coupled tube pairs mounted therein and the anchor fitted over the installation tool, inserted to the blind end of a borehole.

FIGS. 1-4 show the earth loop installation tool 10 as having a head portion 12 and a stem portion 14. The stem portion 14 may be simply a drill string section welded at one end to the rear end face of the tool 10, with a threaded fitting 16 at its free ("distal") end. Running the length, or a major portion of the length, of the head 12 are four slots ("cylindrical recesses" or "scallops") 18, sized to receive ¾ inch plastic tubes 2 as shown in FIG. 9. The recesses 18 are defined between large wings 19 and small wings 21. Of course, alternatively, the slots 18 could be sized to receive any diameter tubing. Tabs 20 serve to constrict the opening of the slots 18 to less than the diameter of the tubes and may be added to better hold the tubes 2 in place prior to placement of the anchor 40 over the tool 10. Due to their elasticity, the tubes 2 snap into place within the slots 18. A grout fitting 24 receives a grout mix through a grout hose, the grout passing through a central passage 22 in the head 12 and exiting the tool head 12 through a grout outlet 26. FIG. 3 shows the lead end face 28 as including the gout outlet 26 and four openings 30 of respective cylindrical recesses 18.

One or more ports 15 in the tool housing provide a path to the drill string fluid passage to allow injection of lubrication and/or flushing agents, via the drill rod during insertion, to reduce friction and clear obstructions. Interior to the drill fluid passage is a check valve 17 to prevent pressure induced backflow of mud, debris and grout into the drill rod.

FIGS. 5-8 show the anchor 40 as including a cap or face plate 46 with four tube apertures 48 extending therethrough, a cylindrical ring 44 integral with (welded to) the face plate 46, and a pair of steel spring plates 42 ("flexible plates") integral with (welded to) the ring 44. The spring plates 42 may be greater than two in number but are preferably sufficiently wide to protect the leading portions of tubes 2 from abrasion during insertion and to protect the grout fitting 24. In addition to serving as a shield for the leading portions of the tubes 2 and grout fitting 24, the anchor 40 provides an anchoring function to retain the tubing loops ("earth loops") 6 in place, adjacent the bottom of the borehole 66, as the drill string 62 and tool 10 are withdrawn, retains the tubing or pipes 6 on the tool 10 during insertion into the borehole 66, protects the grout outlet 26 during insertion, and provides a flat thrust surface for generating a reaction force to the grout injection, separating the anchor 40 from the tool 10 during withdrawal of the tool 10 from the borehole 66.

The first step in installation of the earth loops is the drilling of a borehole 66, at a slant of at least 5°, preferably as great an angle as possible relative to the horizontal, but less than 90°, as allowed by the job site and drilling conditions. This borehole 66, typically about 4 inches in diameter for receiving a pair of ¾ inch tubular earth loops (4 tubes), may be drilled by attaching an auger to the drill string of a horizontal directional drilling machine, whereby the auger may be steered to form an essentially straight borehole. An unmodified Vermeer D7x11 NAVIGATOR® horizontal directional drilling machine, with Firestick® drill rod, standard sand housing and cutting heads, has been successfully used for this purpose. That the borehole be straight is an important consideration in (1) maximizing drilling speed while minimizing wear and tear of the drill string; (2) facilitating insertion of the tool 10 through the borehole to its extremity (blind end) without binding (pushing into the borehole sidewall) in a bend; and (3) facilitating formation of a complete grout seal between the earth loops and the surrounding borehole to maximize the rate of heat exchange between the loop piping and the earth.

The diameter of the borehole is preferably about 1 inch greater than the diameter of the tool. Thus, for a tool about 3 inches in diameter, for installation of one or two earth loops of ¾ inch tubing in the borehole, the borehole will typically be 4 inches to 4½ inches in diameter.

Each inclined borehole is typically 50 feet to 200 feet long, thus accommodating 100 feet to 800 feet of tubing (50-200 ft×1 or 2 loop pairs) in each borehole. A geothermal heat pump requires a length of tubing in effective heat exchange with the earth per ton of capacity, which length varies depending on load requirements, soil conditions and climate region (latitude). Four tubes 2 are paired and ends of each pair are connected with a 180° fitting 4 ("U" bend fitting) to form an earth loop 6 and these fittings 4 are bound together, e.g. by a hose clamp which has been successfully used for this purpose. The four free ends of tubes 2 are then threaded through the four tube apertures 48 in the face plate 46 (cap) of the anchor 40 and the anchor 40 is slid along the tubes 2 to a position flush against the "U"-bend fittings, with the spring plates extending toward the free ends of the tubes as illustrated in FIG. 9. Alternatively, the free ends of coiled tubes 2 may first be inserted through apertures 48 in the face plate 46, followed by attaching the U-bend fitting 4, thus allowing for the tubes to remain coiled for storage and handling. The entire assembly 50 (tool 10, two tubing (earth) loops 6, "U"-bend fittings 4 and anchor 40) is then slid onto the tool 10, each of the four tubes 2 is fitted into a cylindrical recess ("scallop") 18 in the tool 10 and the tool 10 is pushed to where its end face 28 is flush against the face plate 46 of the anchor 40 and the grout outlet 26 is covered by the face plate 46. The assembly 50 is now ready for insertion into the borehole 66. This same process can be also executed using only a single loop (2 pipes). The unused side of the insertion tool is fitted with a dummy loop U-bend fitting or the like and the remainder of the process is unchanged.

The fitting 16 on the free end of the stem 14 is then screwed onto the distal end of a drillstring of a horizontal directional drilling machine 60, e.g. the Vermeer D7x11 NAVIGATOR®, and guided straight in along the borehole to its blind end 68.

After the assembly 50 is bottomed against the blind end 68 of the borehole 60, a grout is injected through grout line 23, fitting 24, central passage 22 and forcibly out of the grout outlet 26 in the end face 28 of tool 10. The force of the grout against the faceplate 46 of the anchor 40 separates the tool 10 from the anchor 40 and, as the grout continues to fill the borehole, the ends 43 of the spring plates 42 are forced by the grout outwardly against the sides of the borehole and the tubes are forced out from the slots 18 of the cylindrical body of the tool 10. The drillstring with tool 10 still attached may then be gradually withdrawn from the borehole as the borehole is filled with grout.

Figure 10:
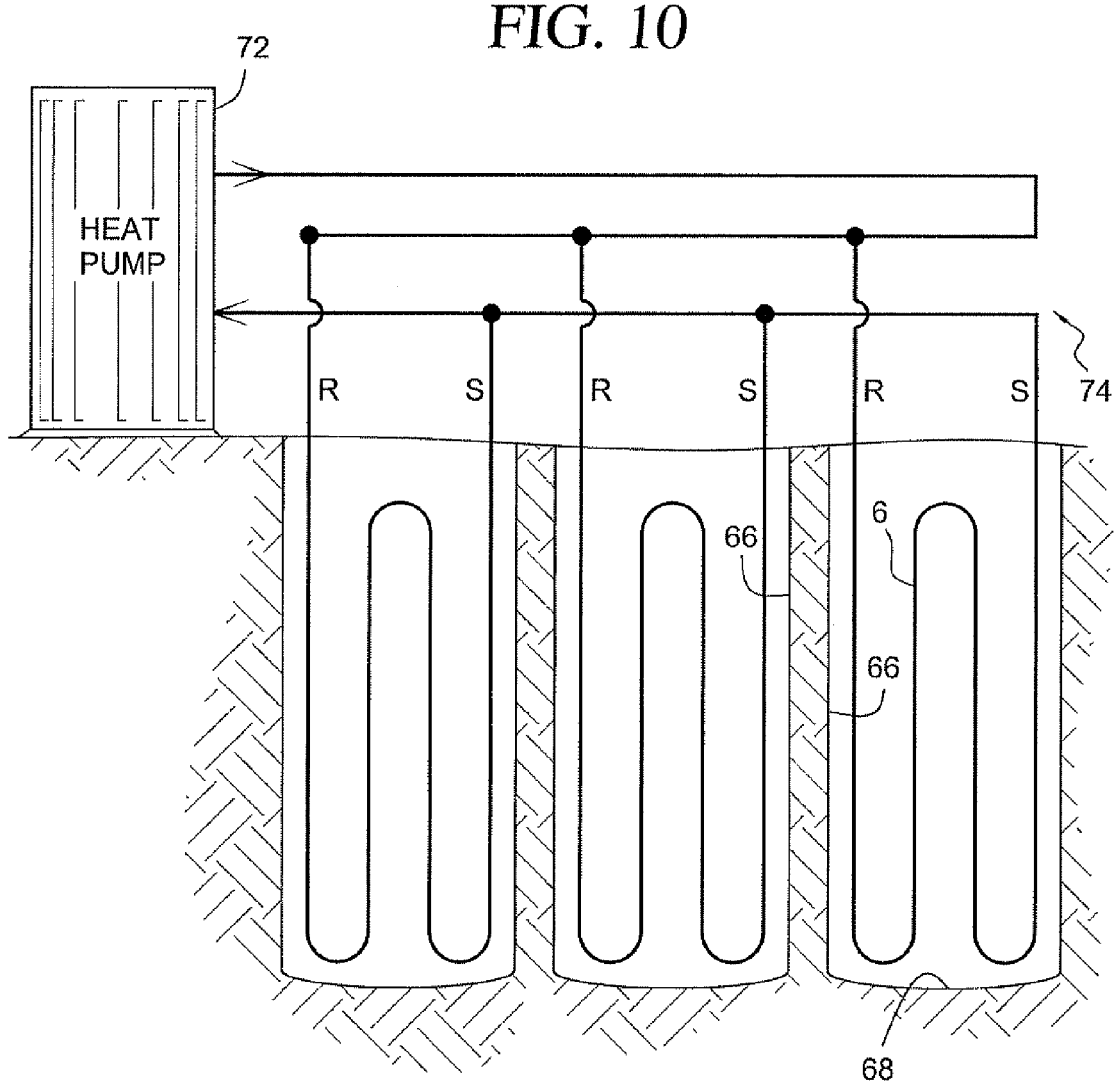
FIG. 10 is a perspective, schematic view of the earth loop assembly as integrated into the geothermal heat pump system of the invention.

In similar fashion, additional boreholes are drilled and additional earth loops 6 emplaced within those boreholes. Two tubes, one of each earth loop within a borehole, are coupled together leaving one tube as a supply line and another tube as a return line for each borehole. Thus, the heat exchange fluid will make four passes within each borehole before exiting that borehole. If the application called for a single loop per borehole, the heat exchange fluid would make 2 passes within the borehole before exiting that borehole. The supply and return lines are connected to a heat pump 72 through a manifold 74, as illustrated in FIG. 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An installation tool for installation of at least one coupled pair of tubes in a borehole, to a blind end of the borehole, the installation tool comprising:
   a cylindrical body presenting a cylindrical outer surface;
   a central passage extending along a central, longitudinal axis of the cylindrical body, from a grout fitting for connecting a grout hose to a central opening at a leading end face of the cylindrical body;
   at least two slots formed in and extending along the length of the cylindrical outer surface, each slot being open at the cylindrical outer surface of the cylindrical body for receiving therein a portion of the length, including a leading end, of one tube of the coupled pair; and
   an anchor which fits over the cylindrical body, wherein the anchor comprises:
      a face plate having tube apertures for receiving the tubes extending therethrough;
      a retainer ring which is integral with the face plate and which removably fits over one end of the cylindrical body to hold, in cooperation with the face plate, the coupled tube pair within the slots during insertion of the tool into the borehole; and
      a pair of flexible plates integral with the retainer ring and extending from opposing positions on the retainer ring, approximately in parallel with the longitudinal axis of the cylindrical body.

2. The installation tool according to claim 1 wherein the flexible plates cover leading end portions of the tubes of the coupled pair.

3. The installation tool according to claim 2 wherein the flexible plates extend from the retainer ring beyond the grout fitting.

4. An installation tool according to claim 1 wherein the opening of each slot is narrowed adjacent the leading end face, relative to the remainder of the opening along the length of the slot.

5. An installation tool according to claim 1 having four of said slots arranged around the central passage.

6. A method for installation of a geothermal heat exchange loop using an installation tool according to claim 1, the method comprising:
   forming a borehole with a blind end in the earth at an angle slanted relative to the horizontal but significantly less than 90° relative to the horizontal;
   coupling ends of a pair of tubes together, leaving opposing ends of the paired tubes free;
   inserting the free ends of the paired tubes through the tube apertures of the face plate and sliding the face plate along the tubes to their coupled ends;
   mounting at least one pair of tubes having ends coupled together, for service as the geothermal heat exchange loop, in the slots of the cylindrical body;
   fitting the retainer ring over the forward end of the cylindrical body to hold the coupled pair within the slots during insertion into the borehole;
   inserting the installation tool to the blind end of the borehole;
   injecting grout through the grout fitting and out the central opening to force the face plate away from the forward end of the cylindrical body, to spread apart the flexible plates and to force the coupled pair of tubes out of the slots;
   withdrawing the cylindrical body from the borehole whereby distal ends of the flexible plates engage the earth to hold the anchor with the borehole, adjacent the blind end, and to cause the cylindrical body to separate from the anchor as the cylindrical body is withdrawn from the borehole; and
   filling the borehole with the grout.

7. A method according to claim 6 wherein the borehole is formed along an approximately straight line.

8. A method according to claim 7 wherein a trailing end of the tool is coupled to a guidable drillstring and the tool is guided straight along a linear path to the blind end of the borehole during insertion.

9. A method according to claim 6 wherein the angle of the borehole relative to the horizontal is 30° to 45°.

* * * * *